(12) United States Patent
Short et al.

(10) Patent No.: US 10,943,099 B2
(45) Date of Patent: Mar. 9, 2021

(54) METHOD AND SYSTEM FOR CLASSIFYING AN INPUT DATA SET USING MULTIPLE DATA REPRESENTATION SOURCE MODES

(71) Applicant: BOOZ ALLEN HAMILTON INC., McLean, VA (US)

(72) Inventors: Nathaniel Jackson Short, Annapolis, MD (US); Srinivasan Rajaraman, Laurel, MD (US); Jonathan M. Levitt, Westborough, MA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/791,740

(22) Filed: Feb. 14, 2020

(65) Prior Publication Data

US 2020/0302157 A1 Sep. 24, 2020

Related U.S. Application Data

(60) Provisional application No. 62/820,658, filed on Mar. 19, 2019.

(51) Int. Cl.
*G06K 9/00* (2006.01)
*G06K 9/62* (2006.01)
*G06N 3/02* (2006.01)

(52) U.S. Cl.
CPC ..... *G06K 9/00288* (2013.01); *G06K 9/00087* (2013.01); *G06K 9/6269* (2013.01); *G06K 9/6288* (2013.01); *G06N 3/02* (2013.01)

(58) Field of Classification Search
CPC ...... G06N 3/02; G06K 9/6288; G06K 9/6269; G06K 9/00087; G06K 9/00288
See application file for complete search history.

(56) References Cited

U.S. PATENT DOCUMENTS

| 6,219,640 | B1 * | 4/2001 | Basu ................. G06K 9/6293 704/246 |
| 10,452,897 | B1 * | 10/2019 | Benkreira ......... G06K 9/00288 |
| 10,671,735 | B2 * | 6/2020 | Gupta ................ G06N 20/00 |
| 10,769,500 | B2 * | 9/2020 | Lee ................... G06K 9/6269 |

(Continued)

OTHER PUBLICATIONS

Etemad, et al., "Discriminant analysis for recognition of human face images", J. Opt. Soc. Am., Aug. 1997, vol. 14, No. 8, pp. 1724-1733.

(Continued)

*Primary Examiner* — Mia M Thomas
(74) *Attorney, Agent, or Firm* — Buchanan Ingersoll & Rooney PC

(57) ABSTRACT

A computer-implemented method for classifying an input data set within a data category using multiple data representation modes. The method includes identifying at least a first data representation source mode and a second data representation source mode; classifying the at least first data representation source mode via at least a first data recognition tool and the at least second data representation source mode via at least a second data recognition tool, the classifying including allocating a confidence factor for each data representation source mode in the data category; and combining outputs of the classifying into a single output confidence score by using a weighted fusion of the allocated confidence factors.

19 Claims, 8 Drawing Sheets

(56) References Cited

U.S. PATENT DOCUMENTS

| | | | |
|---|---|---|---|
| 2003/0184468 A1* | 10/2003 | Chen | G06T 5/40 342/52 |
| 2005/0213810 A1 | 9/2005 | Sabe et al. | |
| 2005/0254996 A1* | 11/2005 | Haupt | G01N 33/0036 422/606 |
| 2005/0286772 A1 | 12/2005 | Albertelli | |
| 2008/0226151 A1* | 9/2008 | Zouridakis | G06K 9/342 382/133 |
| 2008/0260212 A1 | 10/2008 | Moskal et al. | |
| 2011/0040710 A1* | 2/2011 | Connell | G05B 13/028 706/12 |
| 2012/0194662 A1* | 8/2012 | Zhang | G06K 9/2018 348/77 |
| 2017/0160813 A1* | 6/2017 | Divakaran | G06N 20/10 |
| 2018/0139104 A1* | 5/2018 | Seddigh | H04L 41/0213 |
| 2018/0260759 A1* | 9/2018 | Bencke | G06Q 10/06398 |
| 2019/0221213 A1* | 7/2019 | Shah | G10L 15/01 |
| 2019/0258878 A1* | 8/2019 | Koivisto | G06K 9/00825 |

OTHER PUBLICATIONS

Liu, et al., "Comparative Assessment of Independent Component Analysis (ICA) for Face Recognition", Second International Conference on Audio- and Video-based Biometric Person Authentication, Mar. 1999, pp. 1-6.

Liu, et al., "Face Recognition Using Evolutionary Pursuit", Fifth European Conference on Computer Vision, Jun. 1998, 17 pages.

The Examiner's attention is directed to co-pending U.S. Appl. No. 16/791,675, filed Feb. 14, 2020.

M. Soltane et al., "Multi-Modal Biometric Authentications: Concept Issues and Applications Strategies", International Journal of Advanced Science and Technology, Nov. 2012, pp. 1-38, vol. 48.

International Search Report and Written Opinion of the International Searching Authority (Forms PCT/ISA/220, PCT/ISA/210 and PCT/ISA/237) dated May 22, 2020, by the International Bureau of U.S Patent and Trademark Office in corresponding International Application No. PCT/US20/20378. (17 pages).

* cited by examiner

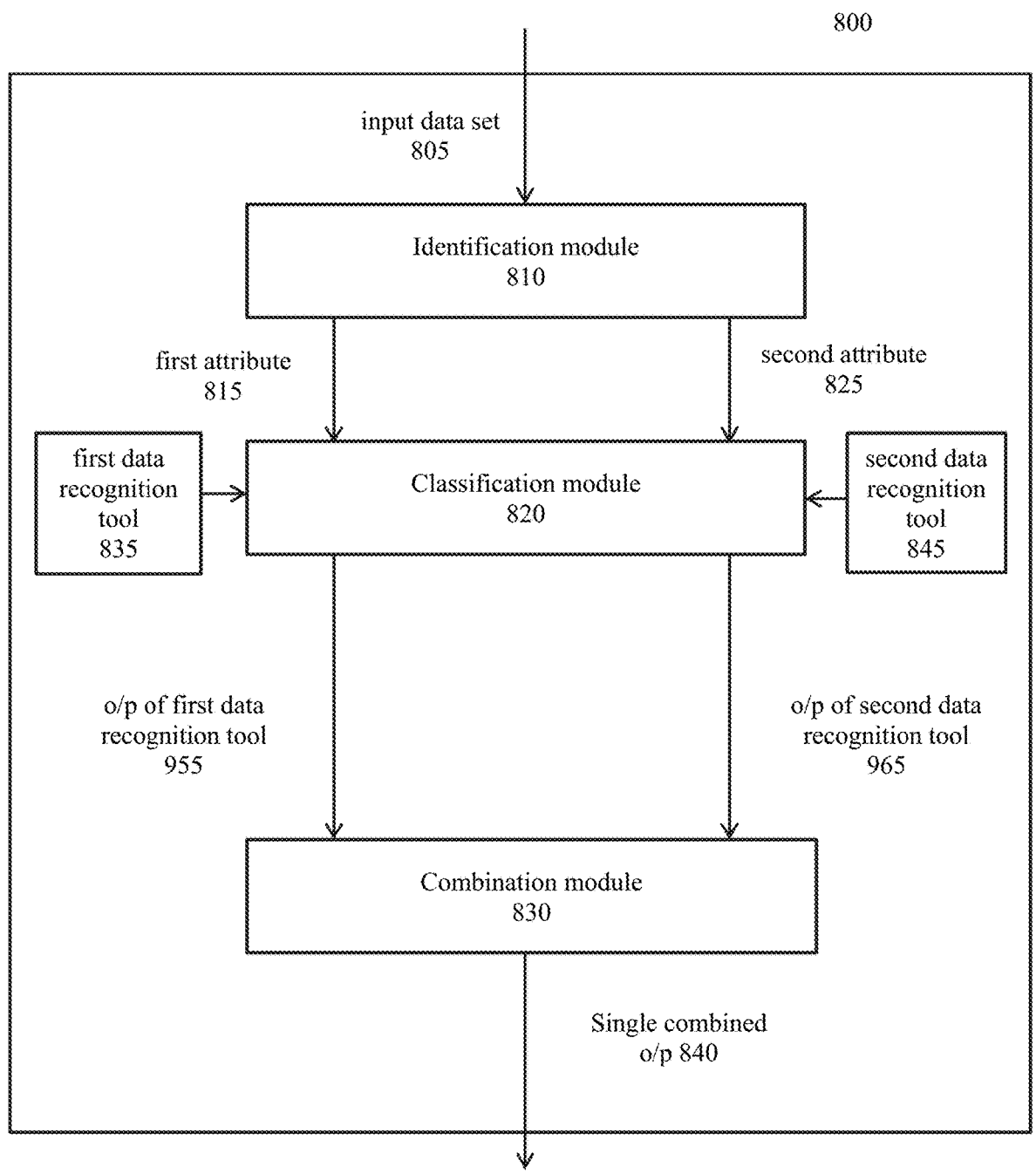

METHOD AND SYSTEM FOR CLASSIFYING AN INPUT DATA SET USING MULTIPLE DATA REPRESENTATION SOURCE MODES

CROSS-REFERENCE TO RELATED APPLICATIONS

This application claims priority to provisional Application No. 62/820,658 filed Mar. 19, 2019.

STATEMENT REGARDING FEDERALLY-SPONSORED RESEARCH OR DEVELOPMENT

This invention was made with U.S. Government support under contract No. DHS S&T//140D7018C0004 awarded by the Department of Interior. The U.S. Government has certain rights in this invention.

FIELD

The present disclosure relates to a system and method for classifying an input data set of attributes with a data category using multiple data representation modes.

BACKGROUND INFORMATION

Data quality (e.g., the resolution/illumination of images; or the amount of noise in an audio file, etc.) can depend on many factors, such as the modality from which the data is sourced (e.g., cameras, microphones, or text from controlled or uncontrolled social media sources, etc.), and the type of data.

Data quality can drive the confidence in automated machine learning algorithm decisions. It can have a significant impact on the performance of trained machine learning models. For example, low quality data input drastically increases the number of errors observed from a classification algorithm.

Known data fusion schemes, such as the one described in The Handbook of Multi-modal Biometric Recognition by Arun Ross (incorporated herein by reference), combine multi-source data using simple arithmetic approaches such as max score or sum score fusion. These known approaches are not adequate to address the challenges that may arise due to low data quality. Aspects of the present disclosure provide a technical solution to the aforementioned technical challenges.

SUMMARY

A computer-implemented method for identifying an image or object by classifying an input data set of attributes within a data category using multiple data representation modes is disclosed. The method includes identifying at least a first data representation source mode and a second data representation source mode; classifying the at least first data representation source mode via at least a first data recognition tool and the at least second data representation source mode via at least a second data recognition tool, the classifying including allocating a confidence factor for each data representation source mode in the data category; and combining outputs of the classifying into a single output confidence score by using a weighted fusion of the allocated confidence factors.

A system for classifying an input data set of attributes within a data category using multiple data representation modes is disclosed. The system includes an identification module configured to identify at least a first data representation source mode and a second data representation source mode; a classification module configured to classify the at least first data representation source mode via at least a first data recognition tool and the at least second data representation source mode via at least a second data recognition tool, the classification including allocating a confidence factor for each data representation source mode in the data category; and a combination module configured to combine outputs of the classification into a single output confidence score by using a weighted fusion of the allocated confidence factors.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which:

FIG. 8 illustrates an exemplary system for classifying an input data set of attributes using multiple data representation modes.

DETAILED DESCRIPTION

Figure 1:
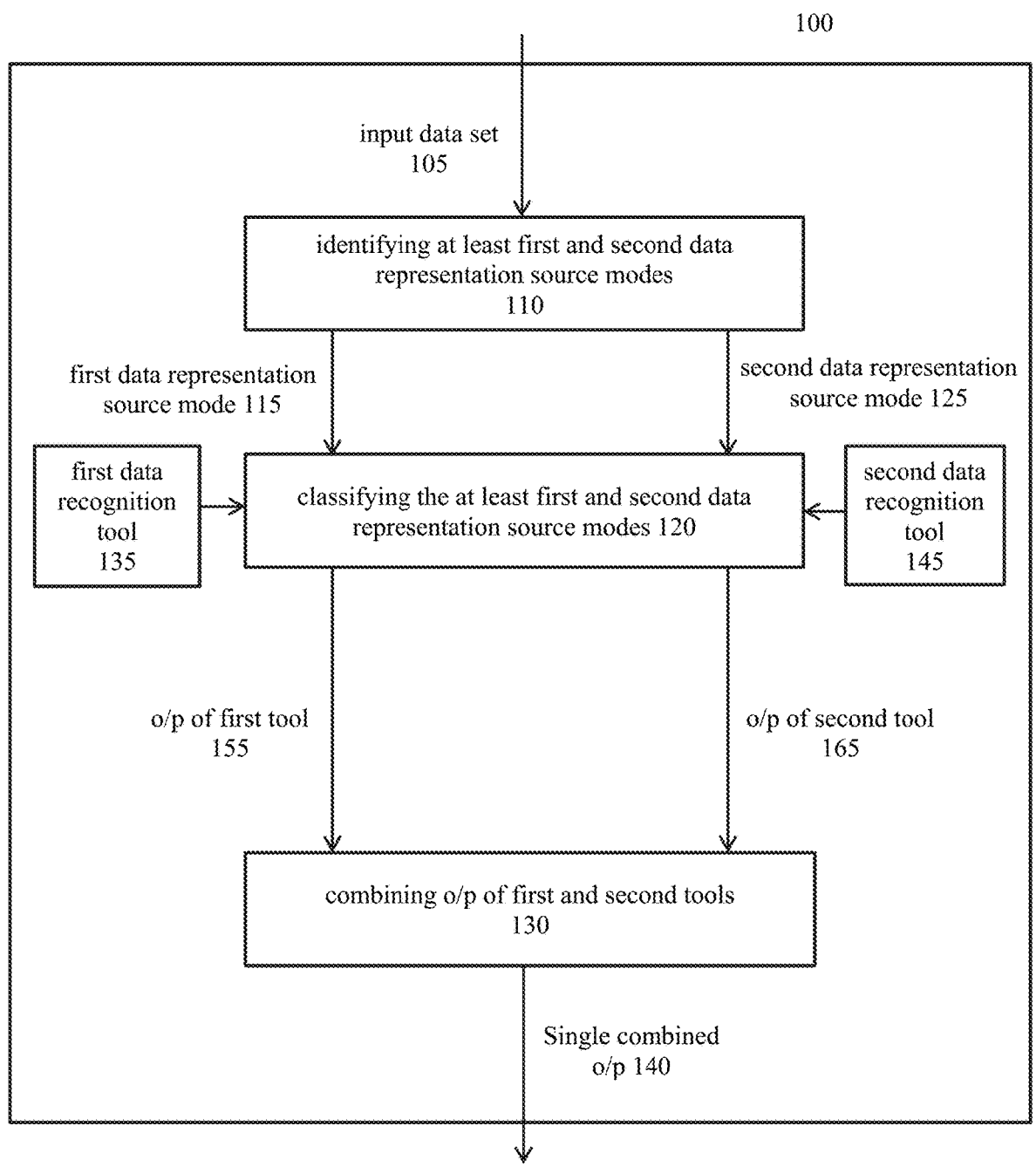
FIG. 1 is an exemplary flowchart for a method for classifying an input data set using multiple data representation source modes.

FIG. 1 shows an exemplary computer-implemented method 100 for classifying an input data set 105 of attributes within a data category using multiple data representation modes. The input data set 105 of attributes can be any type of data, such as biometric data, acoustic data, behavioral characteristics data, etc., or any combination of such types. A data representation source mode, as used herein, can be a type of data obtained via one or more sources that provide the input data set 105 of attributes. For example, if the input data set 105 of attributes is biometric data, then the data representation source modes can be various types of image data (e.g., a fingerprint scan, iris scan, etc.) and/or audio data (e.g., an individual's voice data such as tone, pitch, loudness, etc.).

In an exemplary embodiment, the data representation modes can be data obtained from different machines generating the same type of data. For example, the data representation source modes can be image data obtained from a finger print scanner 1, 2 . . . n, or an iris scanner 1, 2 . . . n. Of course, it can also be a combination of the data representation source modes.

In an exemplary embodiment, the method 100 can include a step 110 of identifying at least a first data representation source mode 115 and a second data representation source mode 125. For example, the first data representation source mode 115 can be identified to be image data obtained from an iris scanner, and the second data representation source mode 125 can be image data obtained from a second (different than the first) iris scanner, as previously explained.

In an exemplary embodiment, the data category, as used herein, can be any categorization (e.g., a sub-set) of the input data set 105 of attributes. For example, if input data set 105 of attributes is biometric data, the data category can be a facial image, fingerprints, iris, palm, hand geometry, DNA (deoxyribonucleic acid), etc.

In an exemplary embodiment, the method 100 can include a step 120 of classifying the at least first data representation source mode 115 via at least a first data recognition tool 135 and the at least second data representation source mode 125 via at least a second data recognition tool 145; the classifying step 120 including allocating a confidence factor (e.g., a match score as described herein) for each data representation source mode (e.g., 115, 125) in the data category.

In an exemplary embodiment, the data recognition tools (e.g., 135, 145) can be selected by a user, or alternatively the selection can be done automatically based on the attribute. For example, the first data recognition tool 135 can automatically be selected to be a logistic regression algorithm if the first data representation source mode 115 is image data. Alternatively, the first data recognition tool 135 can automatically be selected to be a neural network algorithm if the first data representation source mode 115 is audio data. Similarly, the second data recognition tool 145 can be based on the data representation source mode.

In an exemplary embodiment, a user can select the first data recognition tool 135 to be based on a logistic regression algorithm, and the second data recognition tool 145 to be based on a neural network algorithm. Any other known algorithm can of course, be used, and/or a combination of algorithms can be used for different data recognition tools and outputs of these algorithms approach can be combined in weighted manner, as described herein.

Having a data recognition tool for each different data representation source mode is one exemplary embodiment. However, different data recognition tools can, of course, be used for the same data representation source mode. For example, using two different tools to match image data (e.g., a fingerprint scan, iris scan) and then creating a weighted confidence level on the outputs of those tools can be provided. Of course, any number of data recognition tools for any number of data representation source modes can be used.

In an exemplary embodiment, a confidence factor (e.g., a quality score, or match score) can indicate a confidence with which a data representation source mode (e.g., 115, 125) has been properly classified by the at least first recognition tool 135 and/or the second data recognition tool 145. The confidence factor can be allocated on a spectrum scale from 0 to 1 (e.g., a value between 0 and 1, where 0 represents the lowest level of confidence and 1 represents the highest level).

In an exemplary embodiment, the confidence factor can depend on a type of a data representation source mode and a quality of the input data set of attributes. For example, in a case where the data category is facial image and the data representation source mode is an image obtained from a camera, the confidence factor can be 0 if there is a lack of illumination (e.g., a dull image) making it hard to classify. Whereas, if there is extensive illumination (e.g., a bright image with good contrast), the confidence factor can be 1.

Alternately, if the data category is voice data and the data representation source mode is a voice pitch, the confidence factor can be 0 for if the pitch is lower than 20 Hz. Whereas, if the pitch is higher than 500 Hz, the confidence factor can be 1. For pitch values between 20 Hz and 500 Hz, the confidence factor can vary between 0 and 1, such that 0 represents no-confidence in the data representation source mode and 1 represents full-confidence.

In an exemplary embodiment, the confidence factor can be allocated using known systems. For example, if the data category is facial image, then a face verification system VeriLook SDK 1.1 from Neurotechnology Inc., or any other suitable system, can be used. Similarly, if the data category is acoustic data, then VoiceKey SDK from SpeechPro Inc, or any other suitable system, can be used.

In an exemplary embodiment, the method 100 can include a step 130 of combining outputs (e.g., 155, 165) of the classifying 120 into a single output confidence score 140 by using a weighted fusion of the allocated confidence factors, as described in detail herein. Thus, as disclosed herein, solutions are disclosed for combining confidence values (e.g., fused single confidence scores) for one or more data representation source modes (e.g., 115, 125) obtained from plural data recognition tools (e.g., 135, 145) applied on the same input data set 105 of attributes.

For example, in a base case, a single data representation source mode can be run on multiple recognition tools to determine the single combined output confidence score 140. The confidence values, or scores, from the plural (i.e., 2 or more) data recognition tools can be combined, or fused, through machine learning based on measured quality and attributes that are known to impact matchers. The single output confidence score 140 can be, for example, provided on a physical data interface (e.g., a computer (AI) interface, a graphical user interface, or other physical interface, etc.), or used as an input for other applications, or generating reports, etc.

As described herein, combining outputs associated with all data representation source modes, along with measured or assigned quality, can improve confidence over independent machine learning decisions. Exemplary embodiments include two different approaches to determining quality-based confidence value score fusion: Support Vector Machines (SVMs) and Deep Neural Networks (DNNs). Of course, any other known approach can be used in a manner as described herein. The presently disclosed techniques can fuse the data to provide higher confidence decisions, even from low quality data.

SVM classifiers can be large margin classifiers, which differ from logistic regression classifiers in that they seek the decision boundary to maintain maximal distance from the closest point in both data sets. When using SVM classifiers as data recognition tools, the confidence factors (i.e., match scores) can be normalized to have zero mean and unit variance. Those skilled in the art will appreciate that non-normalized scores, can also be used, if properly weighted and or normalized among other data recognition tool outputs.

Figure 2:
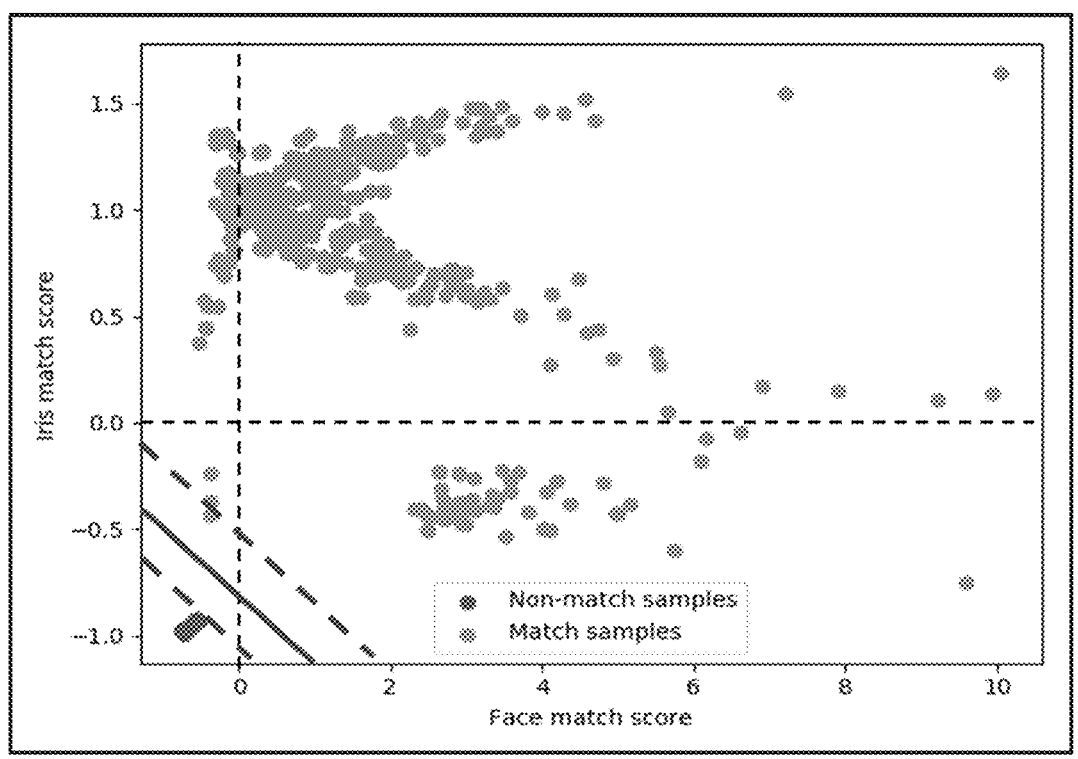
FIG. 2 shows an exemplary scatter plot of face vs. iris confidence factors (i.e., match scores), which is a measure of similarity of two samples.

FIG. 2 shows a scatter plot of face vs. iris match scores, where genuine match samples are denoted by orange circles and impostor match samples are denoted by solid darker circles. The margin of error can be inadequate to confidently classify the data based solely on a match score from one modality. In other words, single modality-based data recognition tools, or classifiers (based on thresholds defined by black dashed lines), can incur significant errors in classifying across different test datasets.

The solid line in FIG. 2 represents a SVM-based classifier with the corresponding dashed lines representing the margin of error in classification. Therefore, the bi-modality score fusion can enable classifiers that can predict more robustly on different datasets than the classifiers based on unimodality.

Figure 3:
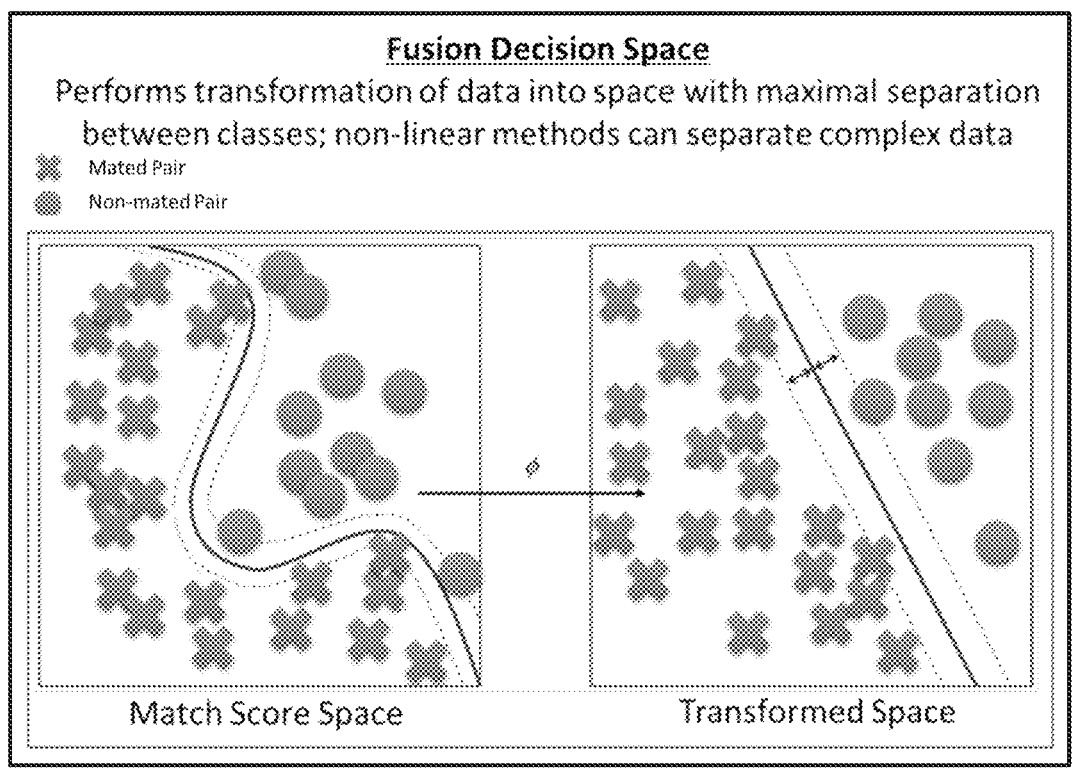
FIG. 3 depicts an exemplary scatter plot of a normalized confidence factor (i.e., match score) space and a non-linear transformed space where confidence factors (i.e., match scores) between two classes have maximal separation.

FIG. 3 (left half) shows a scatter plot of normalized match score space where genuine and imposter scores are not linearly separable. FIG. 3 (right half) shows a transformed space where scores are mapped through non-linear methods to high dimensional space where scores are linearly separable, and classes are maximally separated.

In an exemplary embodiment where a SVM is used as a data recognition tool and confidence factors (i.e., match scores) cannot be distinguished from non-match scores as they lack margin between them, a kernel function such as a Radial Basis Function (RBF) can be used to transform the training data into another dimension that has a clear dividing margin between classes of data.

In an exemplary embodiment, training data can be fit in a non-linear SVM regression y=f(x), where the target y is +1 for a genuine match and −1 otherwise. $\vec{x}_i$ represents the vector of confidence scores from the individual matching algorithms of the various data recognition tools for the $i_{th}$ training example, and $y_i \in \{-1, 1\}$ can be the corresponding target value.

During training, the kernel functions $\vec{K}_j(\vec{x}_i, \vec{x}_i), \ldots, K_j(\vec{x}_n, \vec{x}_i))$ return a feature vector which is the same size as the training data, and after training, only landmark points are used. The regression function can be $f(x) = \langle \vec{w} | \vec{K}(\vec{\beta}, \vec{x}_i) \rangle + b$, where $\vec{K}(\vec{\beta}, \vec{x}_i) = \Sigma_{j=1}^k \beta_k \vec{K}_j(\vec{x}_i)$ can be a weighted average of multiple kernels (e.g., linear and radial basis functions), and w can be a vector of weights that is the solution to the following convex optimization problem: Minimize ½∥$\vec{w}$∥2/2+C$\Sigma_{i=1}^N \xi_i$, where $\vec{w}$ is a real vector, and the slack variables $\xi_i$ are non-negative and real, subject to the following margin constraint, which is identical to the SVM large margin constraint when the parameters $\vec{\beta}$ are held constant, $y_i(\langle \vec{w} | \vec{K}(\vec{\beta}, \vec{x}_i) \rangle + b) \geq 1 - \xi_i$.

In an exemplary embodiment, the parameter C in the previously described optimization problem can be a non-negative real number that trades off correct classification into categories of training examples against maximization of the decision function's margin. For example, for larger values of C, a smaller margin will be accepted if the decision function is better at classifying all training points correctly. A lower C will encourage a larger margin, therefore a simpler decision function, at the cost of training accuracy. In other words, C can behave as a regularization parameter in the SVM.

In an exemplary embodiment, for each value of the parameter C, solving for the weight parameters $\vec{w}$ is an optimization problem that is solved using Stochastic Gradient Descent (SGD) and implemented using Python's SCIKIT-LEARN package. Both a linear and non-linear radial basis function kernel can be implemented to perform match score fusion.

Figure 4:
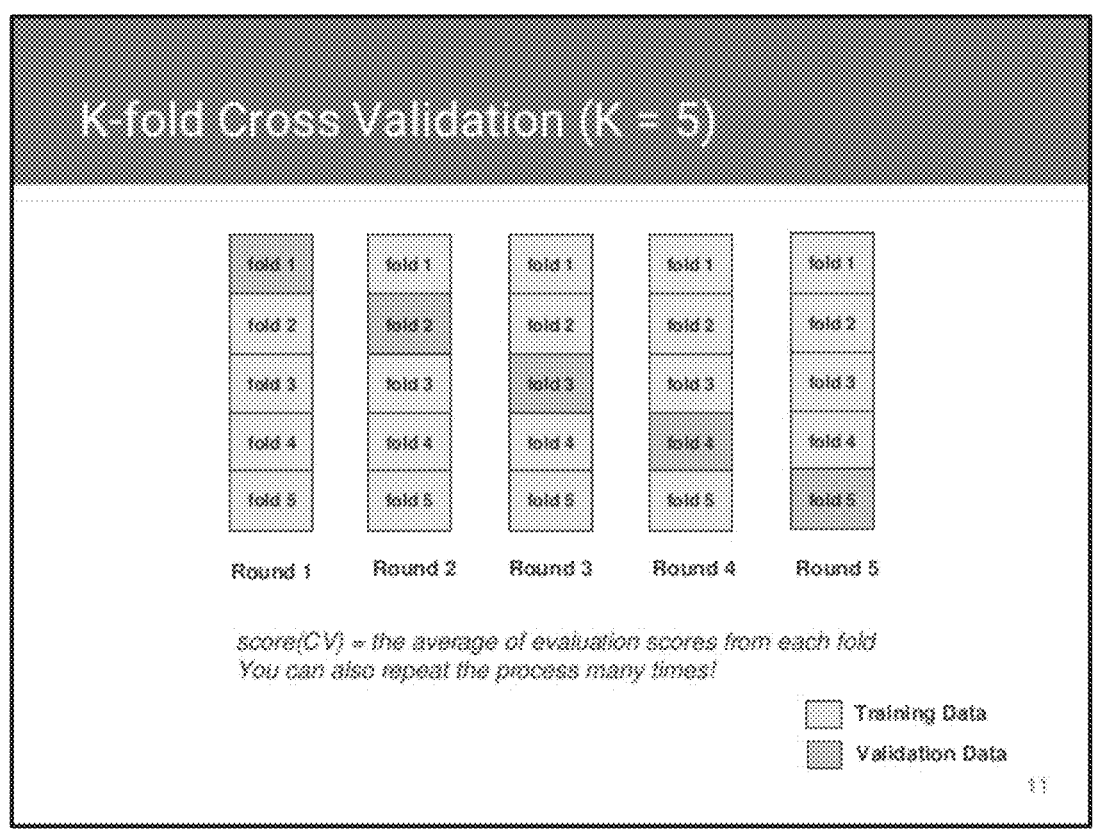
FIG. 4 shows an exemplary schematic of K-fold cross validation.

FIG. 4 shows an exemplary schematic of K-fold cross validation (K=5) to obtain an enhanced (e.g., optimal) value of parameter C. An exemplary training dataset can be split nearly equally into K-folds, (e.g., K=5), and the classifier can be trained on a leave-one-out basis. The aggregate score (i.e., training error) from each leave-one-out subset can be used to determine an enhanced, optimal parameter C and the resulting optimal classifier model.

In an exemplary embodiment, when C can be continuous variable, a problem of finding optimal C can be solved in a numerical fashion as follows. First a nominal range of search space can be selected for C followed by discretizing that range into grid points. The aggregate score of the trained classifier can be evaluated on the K-fold validation splits at each grid point and the one that provides the minimum value is sought. The above step can be repeated on a new range of C that is around C value yielding minimum error from the previous step. In this way, the space of C can be searched from a coarser to a finer grid pattern. The iteration can be stopped after improvement in training error falls below a chosen threshold.

In an exemplary embodiment, a neural network (e.g., DNN) based approach can be implemented to combine data quality and classifier scores to improve decision confidence. Such an approach can have an advantage of being highly non-linear and having a large number of weights that can be tuned to model a highly variable dataset. DNNs can be more effectively trained on a large dataset, whereas SVMs can be trained more effectively on a limited dataset. As such, the presently disclosed approach allows both methods (e.g., DNN and SVM) to be available for evaluation on a large dataset.

In an exemplary embodiment, the present disclosure addresses the specifics of the number of hidden layers and the number of nodes in each hidden layer for the DNN design by selecting a DNN architecture where there is an implicit relationship between the number of nodes in a layer and the index of the hidden layer.

In an exemplary embodiment, the presently disclosed DNN architecture can set the number of nodes of a hidden layer as $NB^i, \forall i \in \{2, \ldots\}$, where N denotes the number of nodes in a first hidden layer and $B \in \{2, \ldots\}$ denotes the expansion factor. Further, N can be given by $B^{ceil(log_B n_f)}$, where ceil( ) denotes the ceiling function and $n_f$ denotes the dimension of input attributes.

Figure 5:
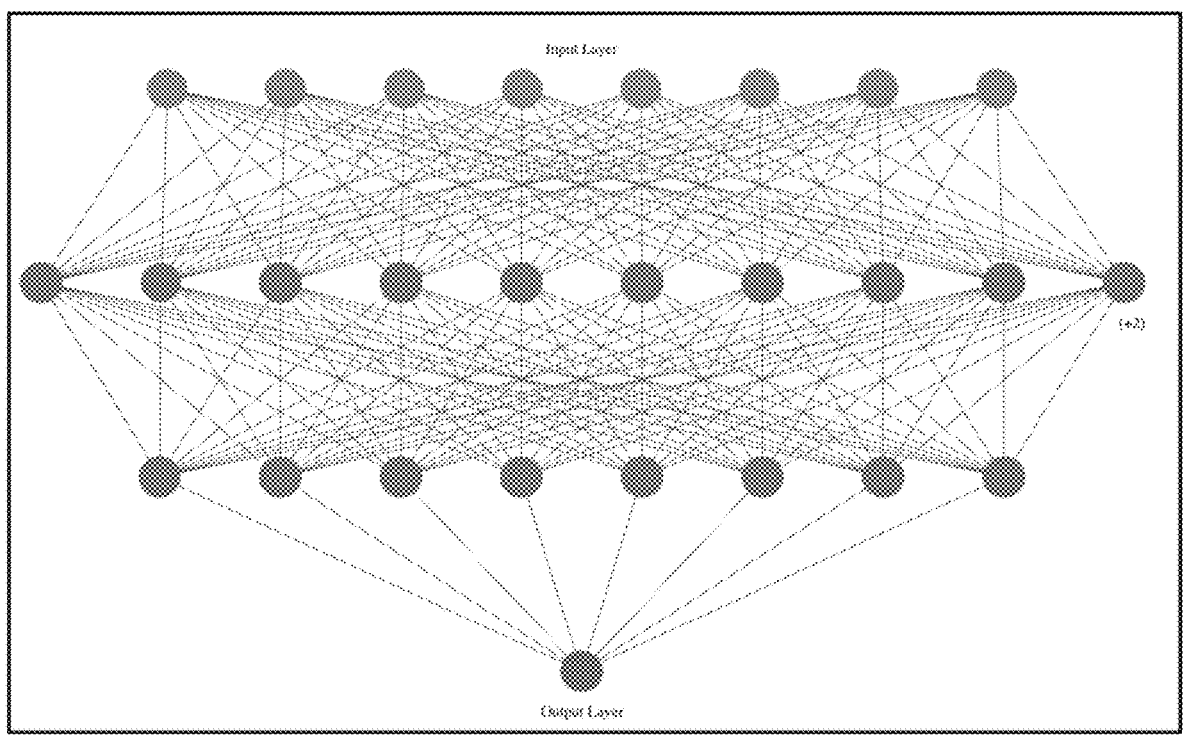
FIG. 5 illustrates an exemplary schematic of a representative 3-layer deep neural network.

FIG. 5 shows an exemplary schematic of a representative 3-layer deep neural network (e.g., for B=2 and $n_f$=2). A cross-entropy loss minimization can be selected as the objective function for training the weights of a DNN model using TensorFlow core libraries through Keras-API.

Figure 6:
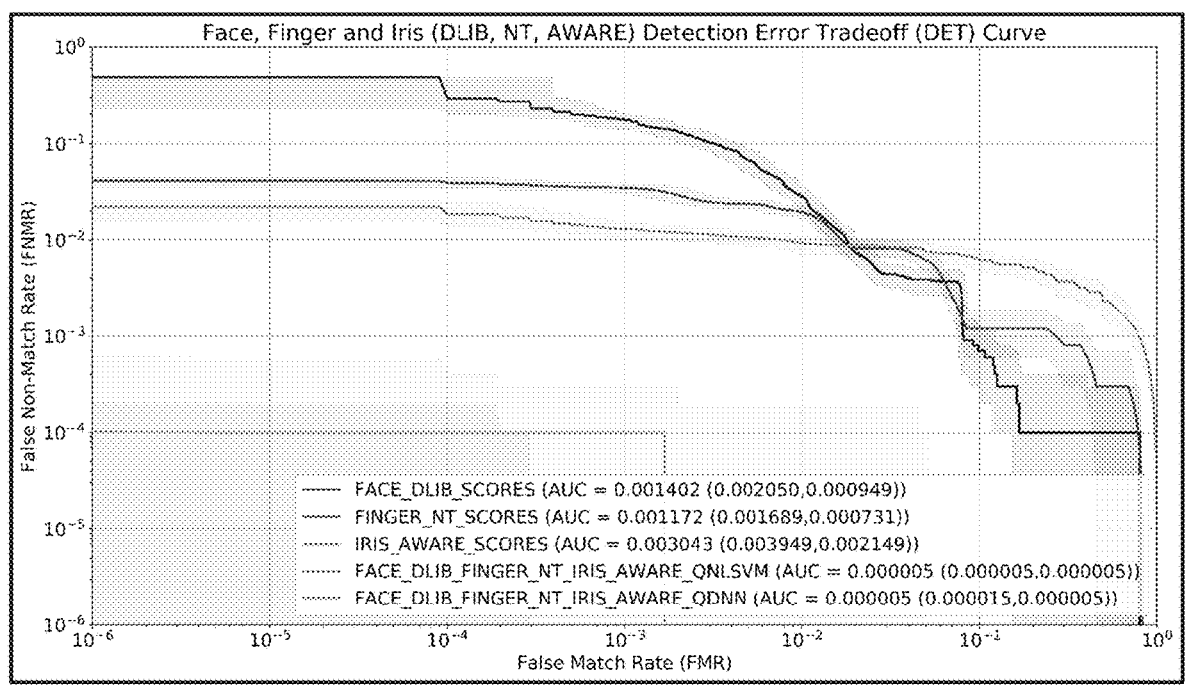
FIG. 6 shows exemplary detection error trade-off curves.

FIG. 6 presents exemplary results from fusing face, finger and iris scores across non-linear SVM with quality and DNN with quality, along with unimodal performance. Also illustrated are the exemplary Detection Error Trade-off (DET) curves showing unimodal and fused system performance as the measured False Non-Match Rate as the False Match Rate (FMR) decreases for Face, Finger and Iris matching systems. The shaded region around each curve indicates the confidence bounds as found using an exemplary known Subset Bootstrapping method. The callout box lists the Area Under the Curve (AUC) with upper and lower bounds for a 95% confidence interval.

In an exemplary embodiment, confidence intervals for FNMR, FMR, and DET curve performance metrics can be estimated using the "subsets bootstrap" method. The subsets bootstrap can be a resampling method that approximates the distribution of estimators by generating a random subset created by repeated draws with replacement from the empirical distribution of the data. This method can overcome challenges of model-based confidence interval methods by allowing assumptions of trial independence and understanding of the underlying distribution of observed error rates to be relaxed.

As illustrated in FIG. 6, the presently disclosed non-linear SVM and the DNN approach far exceeds the performance of unimodal matching systems. The performance of DNN-based classification was statistically indistinguishable than that of the SVM-based classification. However, the efficiency of DNN model training on large datasets holds good prospects for using DNN-based classification.

Figure 7:
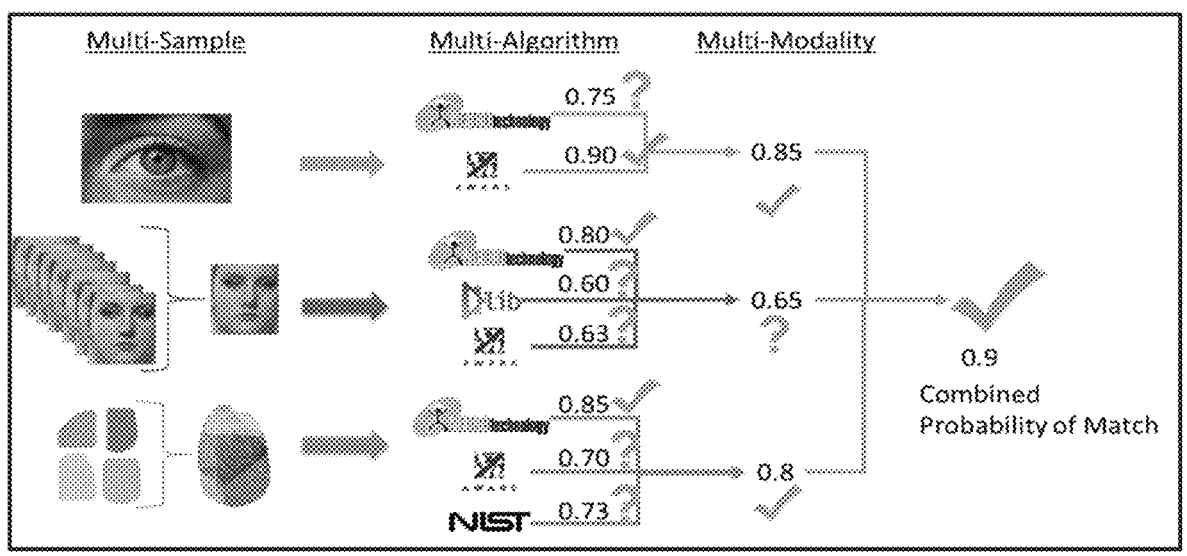
FIG. 7 shows an exemplary multi-sample fusion to combine multiple instances of the same input data set.

FIG. 7 shows exemplary multi-sample fusion to combine multiple instances of, for example, the same input data set (e.g., biometric at the image or feature level) using weighted outputs of multiple data recognition tools. This can be done by aligning and combining 2-D images to improve quality, stitching multiple views of a face through 3-D reconstruction, or combining multiple, partial fingerprint regions into a larger composite image.

In an exemplary embodiment, the multi-algorithm fusion can be implemented as a system for combining probabilities of multiple machine learning algorithms within the multiple data recognition tools through quality attribute analysis, combining the outputs from different matching algorithms applied to the same biometric sample based on modeled performance and measured quality attributes. For example, combining the confidence factors from known matcher tools, such as score outputs from known Neurotechnology and AWARE iris matcher tools, into a single, higher confidence score represented as a single confidence score, so that each modality has only one match score.

In an exemplary embodiment, the single modality scores through multi-modal score fusion can be combined via a system for quality-driven, multi-source data fusion to improve machine learning decision confidence, combining the confidence factors (i.e., match scores) and quality from each independent modality to increase the confidence in a multi-modal comparison.

In an exemplary embodiment, this approach can be extensible beyond the imaging domain to applications such as human identification or object recognition based on imaging data or acoustics or any combination thereof. For example, combining multiple speaker verification algorithm confidence scores based on quality attributes of audio, or combining multiple vehicle recognition algorithm confidence scores based on acoustic measurements and quality attributes.

Exemplary embodiments can be configured for speaker authentication. Exemplary embodiments can be used in image fusion from electro-optical/infrared (EO/IR) satellite imagery or other ISR platforms, and used, for example, to improve object detection and recognition for obstacle avoidance in self driving vehicles, track, detect and identify human subjects, vehicles and other objects from overhead and ground based cameras for event crowd monitoring, retail or other commercial building security.

FIG. 8 shows an exemplary system 800 for classifying an input data set 805 within a data category using multiple data representation modes. In an exemplary embodiment, the system 800 can include an identification module 810 configured to identify at least a first data representation source mode 815 and a second data representation source mode 825, as previously described in step 110.

In an exemplary embodiment, the system 800 can include a classification module 820 configured to classify the at least first data representation source mode 815 via at least a first data recognition tool 835 and the at least second data representation source mode 825 via at least a second data recognition tool 845, the classification including allocating a confidence factor for each data representation source mode in the data category, as previously described in step 120.

In an exemplary embodiment, the system 800 can include a combination module 830 configured to combine outputs of the classifying into a single output confidence 840 by using a weighted fusion of the allocated confidence factors, as previously described in step 130. The system 800 can include a physical data interface (e.g., a computer (AI) interface, a graphical user interface, or other physical interface) to provide the single output confidence 840.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A hardware processor, as used herein, can be a special purpose or a general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable computing device to implement the present methods as discussed herein. In particular, the computer programs stored on a non-transitory computer-readable medium, when executed, can enable hardware processor device to implement the methods illustrated by FIGS. 2 and 4, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A computer-implemented method for classifying an input data set of data derived from sensors using multiple data representation modes wherein each data representation mode has a corresponding input data set of attributes within a data category, the method comprising:
   identifying at least a first data representation source mode and a second data representation source mode;
   classifying the input data set of attributes corresponding to the at least first data representation source mode via at least a first data recognition tool and the input data set of attributes corresponding to the at least second data representation source mode via at least a second data recognition tool, the classifying including allocating a confidence factor for each data representation source mode in the data category, each confidence factor being allocated based on at least a quality measure of the input data set of attributes corresponding to the data representation source mode; and
   combining outputs of the classifying into a single output confidence score by using a weighted fusion of the allocated confidence factors.

2. The method of claim 1, wherein the allocating of a confidence factor is further based on a type of a data representation source mode.

3. The method of claim 1, wherein the classification is a person and the data category is associated with at least one input data set of attributes, and the at least one of a facial image, a fingerprint, iris image, palm image, hand geometry, or DNA.

4. The method of claim 3, wherein the data category is spatial or structural data, the input data set of attributes includes features of a facial image and at least one of the corresponding at least first and second data representation source modes is an image obtained from a visible or infrared camera.

5. The method of claim 1, wherein the data category is acoustic data and the input data set of attributes is one or more of audio pitch, tone, loudness, timbre, or other type of acoustic quality attributes.

6. The method of claim 1, wherein the at least one quality measure of the input data set of attributes from a data representation source mode is at least one of signal-to-noise ratio, contrast, motion blur, or other type of associated quality measure.

7. The method of claim 6, wherein the classifying step comprises: combining one or more of the data categories including acoustic data, biometric data, spatial or structural data, and associated quality measures.

8. The method of claim 1, wherein the input data set of attributes of the first data representation source mode is classified based on a support vector machine algorithm.

9. The method of claim 1, wherein the input data set of attributes of the second data representation source mode is classified based on a neural network algorithm.

10. The method of claim 1, wherein the combining outputs comprises:
    applying a multi-algorithm fusion approach.

11. The method of claim 10, wherein the multi-algorithm fusion approach is based on a support vector machine algorithm, a neural network algorithm, or a combination of support vector machine and neural network algorithms.

12. The method of claim 1 wherein the classifying step is performed to identify at least one of an object, image, or audio signal are identified.

13. A system for classifying an input data set of data derived from sensors using multiple data representation modes, wherein each data representation mode has a corresponding input data set of attributes within a data category, the system comprising:
    an identification module configured to identify at least a first data representation source mode and a second data representation source mode;
    a classification module configured to classify the input data set of attributes corresponding to the at least first data representation source mode via at least a first data recognition tool and the input data set of attributes corresponding to the at least second data representation source mode via at least a second data recognition tool, the classification including allocating a confidence factor for each data representation source mode in the data category, each confidence factor being allocated based on at least a quality measure of the input data set of attributes corresponding to the data representation source mode; and
    a combination module configured to combine outputs of the classification into a single output confidence score by using a weighted fusion of the allocated confidence factors.

14. The system of claim 13, wherein the classification module is further configured to allocate each confidence factor based on a type of the data representation source mode.

15. The system of claim 13, wherein the combination module is configured to apply a multi-algorithm fusion approach to combine the confidence factors output by the classification module into a single output confidence score.

16. The system of claim 13, wherein the combination module is configured for applying a multi-algorithm fusion approach.

17. The system of claim 16, wherein the multi-algorithm fusion approach is based on a support vector machine algorithm, a neural network algorithm, or a combination of support vector machine and neural network algorithms.

18. The system of claim 13, comprising:
- a physical data interface to provide the single output confidence score.

19. The system of claim 13 wherein the input data set of attributes are classified to identify at least one of an object, image, or audio signal.

\* \* \* \* \*